United States Patent
Lee et al.

(10) Patent No.: US 8,664,893 B2
(45) Date of Patent: Mar. 4, 2014

(54) FEEDBACK CONTROL CIRCUIT AND LED DRIVING CIRCUIT

(75) Inventors: Li-Min Lee, New Taipei (TW);
Shian-Sung Shiu, New Taipei (TW);
Chung-Che Yu, New Taipei (TW);
Hai-Po Li, Wuxi (CN)

(73) Assignee: Green Solution Technology Co., Ltd., New Taipei (TW)

( * ) Notice: Subject to any disclaimer, the term of this patent is extended or adjusted under 35 U.S.C. 154(b) by 272 days.

(21) Appl. No.: 13/218,405

(22) Filed: Aug. 25, 2011

(65) Prior Publication Data
US 2012/0112645 A1 May 10, 2012

(30) Foreign Application Priority Data
Nov. 4, 2010 (CN) ............................ 2010 1 0538193

(51) Int. Cl.
*H05B 37/02* (2006.01)
(52) U.S. Cl.
USPC .......................... 315/307; 315/219; 315/308
(58) Field of Classification Search
USPC ............. 315/291, 307, 308, 219, 224, 185 R, 315/186, 193, 225
See application file for complete search history.

(56) References Cited

U.S. PATENT DOCUMENTS

| | | | |
|---|---|---|---|
| 6,621,235 B2 | 9/2003 | Chang | |
| 8,334,661 B2 * | 12/2012 | Lee et al. | 315/291 |
| 8,339,067 B2 * | 12/2012 | Lin et al. | 315/291 |
| 2009/0225020 A1 | 9/2009 | Ran et al. | |
| 2011/0127921 A1 * | 6/2011 | Lin et al. | 315/192 |

FOREIGN PATENT DOCUMENTS

| | | |
|---|---|---|
| CN | 101335488 | 12/2008 |
| CN | 101425752 | 5/2009 |
| CN | 101489335 | 7/2009 |
| CN | 101662871 | 3/2010 |
| CN | 101820709 | 9/2010 |
| TW | 200820826 | 5/2008 |
| TW | 200930147 | 7/2009 |

OTHER PUBLICATIONS

"Office Action of China Counterpart Application", issued on Jul. 30, 2013, p. 1-p. 7.
"Office Action of Taiwan Counterpart Application", issued on Oct. 16, 2013, pp. 1-10.

\* cited by examiner

*Primary Examiner* — David H Vu
(74) *Attorney, Agent, or Firm* — Jianq Chyun IP Office

(57) ABSTRACT

The present invention provides a feedback control circuit and an LED driving circuit for using the same, wherein the feedback control circuit receives a dimming signal. The dimming signal is changed between a first state and a second state. When being in the first state, the feedback control circuit controls a converter circuit to drive the LED module for lighting stably. When being in the second state, the feedback control circuit controls the converter circuit to maintain the power conversion of the converter circuit to have an output voltage outputted by the converter circuit maintained at a level close to a lighting threshold voltage of the LED module.

15 Claims, 4 Drawing Sheets

FEEDBACK CONTROL CIRCUIT AND LED DRIVING CIRCUIT

CROSS-REFERENCE TO RELATED APPLICATION

This application claims the priority benefit of China application serial no. 201010538193.8, filed on Nov. 4, 2010. The entirety of the above-mentioned patent application is hereby incorporated by reference herein and made a part of this specification.

BACKGROUND OF THE INVENTION (1) Field of the Invention

This invention relates to a feedback control circuit of an LED driving circuit, and more particularly relates to the feedback control circuit of an LED driving circuit for enhancing LED diming accuracy.

(2) Description of the Prior Art

Because of the properties of long lifetime, high luminance efficiency, fast and steady illumination, and etc., LED has been broadly accepted as the main trend of light sources for the next generation in recent years. The LEDs can be used in various applications, including interior lighting, exterior lighting, and commercial advertisement lighting, and etc., and thus the existing light sources are gradually replaced by the LEDs. It is an important issue to have the LEDs generate illumination with steady brightness and uniform color and provide suitable protection to the LEDs to bring the lighting advantages of the LEDs into play.

FIG. 1 is a circuit diagram of a typical LED driving circuit. As shown, the LED driving circuit includes a feedback control circuit 100, a converter circuit 130, and an LED module 140. The converter circuit 130 is coupled to an input power source VIN. The feedback control circuit 100 generates a control signal Sc1 to control the conversion operation of the converter circuit 130. The output of the converter circuit 130 is coupled to the LED module 140 for applying an output voltage VOUT to the LED module 140 such that an output current IOUT corresponding to the output voltage VOUT is generated flowing through the LED module 140 to generate illumination. The output current IOUT also flows through a current sensing resistor Ri for generating a current feedback signal IFB1.

The feedback control circuit 100 includes a pulse width control unit 110 and a feedback unit 120. The feedback unit 120 has an amplify unit 122 and a compensation unit 124. The amplify unit 122 receives the current feedback signal IFB1 and a reference signal Vr and generates an output signal. The output signal is compensated by the compensation unit 124 so as to generate a pulse width control signal Vea1. The pulse width control unit 110 includes a pulse width modulation unit 112 and a driving unit 114. The pulse width modulation unit 112 receives the pulse width control signal Vea1 and a triangular signal so as to generate a pulse width modulation signal S1 to the driving unit 114. The driving unit 114 generates the control signal Sc1 according to the pulse width modulation signal S1.

Generally, the feedback control circuit 100 would be able to stabilize the output current IOUT at a predetermined current value Io such that the output voltage VOUT would be stabilized at a predetermined voltage value Vo also. However, the feedback control carried out by the amplify unit 122, which compares the current feedback signal IFB1 and the reference signal Vr, and the compensation unit 124, which compensates the error of the above two signal to adjust the level of the pulse width control signal, may generate the output current IOUT and the output voltage VOUT with the values close to the predetermined output current Io and the predetermined output voltage Vo.

FIG. 2 is a diagram of waveforms describing dimming process of the LED driving circuit in FIG. 1. The driving unit 114 receives a dimming signal DIM and according to the dimming signal DIM decides whether outputting the control signal Sc1 or not. In the time zone from T1 to T4, the dimming signal DIM implies ON state and the driving unit 114 outputs the control signal Sc1. In the time zone from T4 to T1, the dimming signal DIM implies OFF state and the driving unit stops outputting the control signal Sc1. In the time zone from T4 to T1, because the driving unit 114 stops outputting the control signal Sc1 to have the converter circuit 130 stopped transmitting power to the LED module 140, the level of the output voltage VOUT may decline to the lighting threshold voltage Vf of the LED module 140 at time point T5 and so the output current IOUT would be reduced to zero. In such condition, a positive error between the reference signal Vr and the current feedback signal IFB1 is generated to enhance the level of the pulse width control signal Vea1, even to the maximum level. The output voltage VOUT would be maintained at the lighting threshold voltage with no power loss in the time zone from T4 to T1 in ideal, however, leakage current is unpreventable in actual circuit, which may result in the decreasing of output voltage VOUT, even to the level below the lighting threshold voltage Vf in the time zone from T5 to T1. At time point T1, as the driving unit 144 retrieves the control signal Sc1, the duty cycle of the control signal Sc1 would be maximized for the level of the pulse width control signal Vea1 is at the maximum.

Then, after time point T2, the increasing output current IOUT is above the predetermined output current Io, the amplify unit 122 begins to lower the level of the pulse width control signal Vea1. However, because of the characteristics of the compensation unit 124, the pulse width control signal Vea1 cannot quickly decline to a stable level Vea1$o$, which is the level of the pulse width control signal Vea1 corresponded to the predetermined output current Io. At this time, the duty cycle of the control signal Sc1 is too large with respect to the output current IOUT. Thus, the output current IOUT keeps increasing until the pulse width control signal finally decreases below the stable level Vea1$o$. As the output current IOUT declines below the predetermined output current again, the level of the pulse width control signal Vea1 increases again and then to level above the stable level Vea1$o$. The above mentioned cycle repeats until time point T3, when the output current IOUT, the output voltage VOUT, and the pulse width control signal Vea1 converge to the predetermined output current Io, the predetermined output voltage Vo, and the stable level Vea1$o$.

Thus, as the dimming signal indicates the OFF state corresponded to the time zone from T4 to T1, the output voltage VOUT may decline to the level below the lighting threshold voltage Vf because of leakage current, and as the dimming signal indicates the ON state corresponded to the time zone from T1 to T4, the LED driving circuit needs a long time before reaching stable state, which may influence dimming accuracy of the LED driving circuit.

SUMMARY OF THE INVENTION

Accordingly, the present invention controls the converter circuit sustains a small amount of power conversion even when the dimming signal indicates off state, so as to keep the output voltage of the converter circuit at the level close to the lighting threshold voltage of the LED module. The output voltage and the control signal for the converter circuit may be kept at adjacent to the stable value to facilitate stable operation of the converter circuit at the next cycle.

For the above mentioned objects a feedback control circuit utilized for controlling a converter circuit to convert a power for driving an LED module is provided in the present invention. The feedback control circuit has a feedback unit and a pulse width control unit. The feedback unit receives a feedback signal responding to a state of the LED module and generates a pulse width control signal accordingly. The pulse width control unit generates at least one control signal for controlling the converter circuit according to the pulse width control signal. The pulse width control unit has a dimming control unit and a driving unit. The dimming control unit generates a dimming control signal according to a dimming signal and a pulse signal generated by a dimming off control unit. The driving unit generates the control signal according to the pulse width control signal and the dimming control signal. The dimming signal is changed between a first state and a second state. The feedback control circuit controls the converter circuit to drive the LED module to generate steady illumination as the dimming signal is in the first state, and the feedback control circuit controls the converter circuit keeps operating to have an output voltage thereof sustained at a level close to a lighting threshold voltage of the LED module as the dimming signal is in the second state.

An LED driving circuit for driving an LED module which has a plurality of LED strings connected in parallel is also provided in the present invention. The LED driving circuit has a current balancing module, an extreme voltage detecting circuit, a converter circuit, and a feedback control circuit. The current balancing module has a plurality of current balance nodes corresponding to the plurality of LED strings for balancing currents on the plurality of LED strings. The extreme voltage detecting circuit is coupled to the plurality of current balancing nodes and generates a feedback signal according to levels of the plurality of current balancing nodes. The converter circuit is coupled to the LED module for converting an input voltage into an output voltage to drive the LED module. The feedback control circuit receives a dimming signal and is changed to a first state or a second state according to the dimming signal for controlling power conversion of the converter circuit. An average amount of power converted by the converter circuit when the feedback control circuit is in the first state is greater than that when the feedback control circuit is in the second state, and the average amount of power in the second state is greater than zero.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 1:
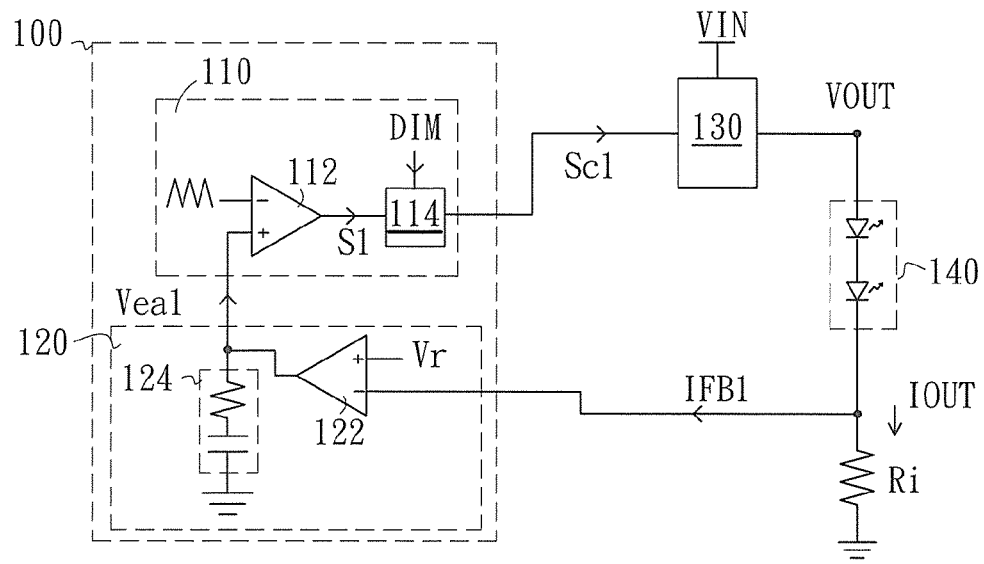
FIG. 1 is a circuit diagram of a typical LED driving circuit.
Figure 2:
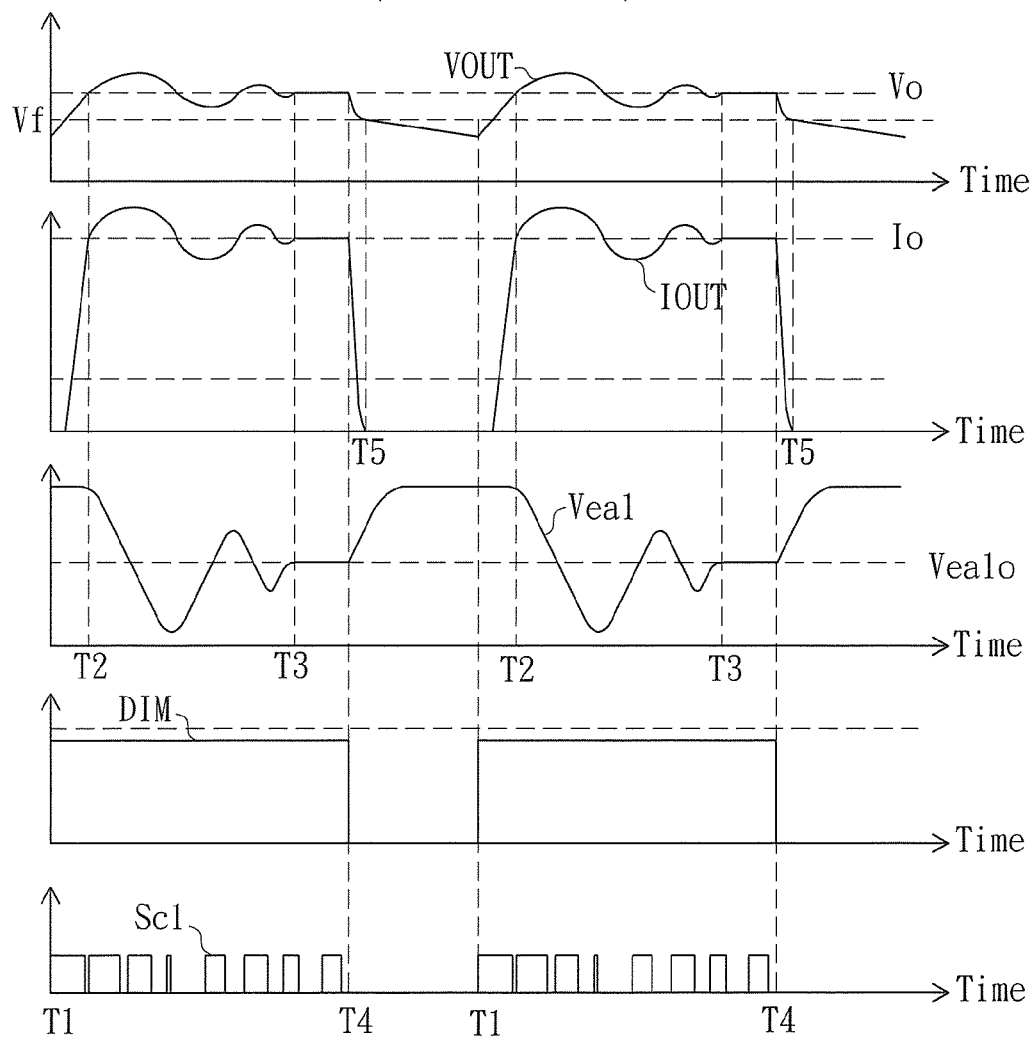
FIG. 2 is a diagram of waveforms describing dimming process of the LED driving circuit in FIG. 1.
Figure 3:
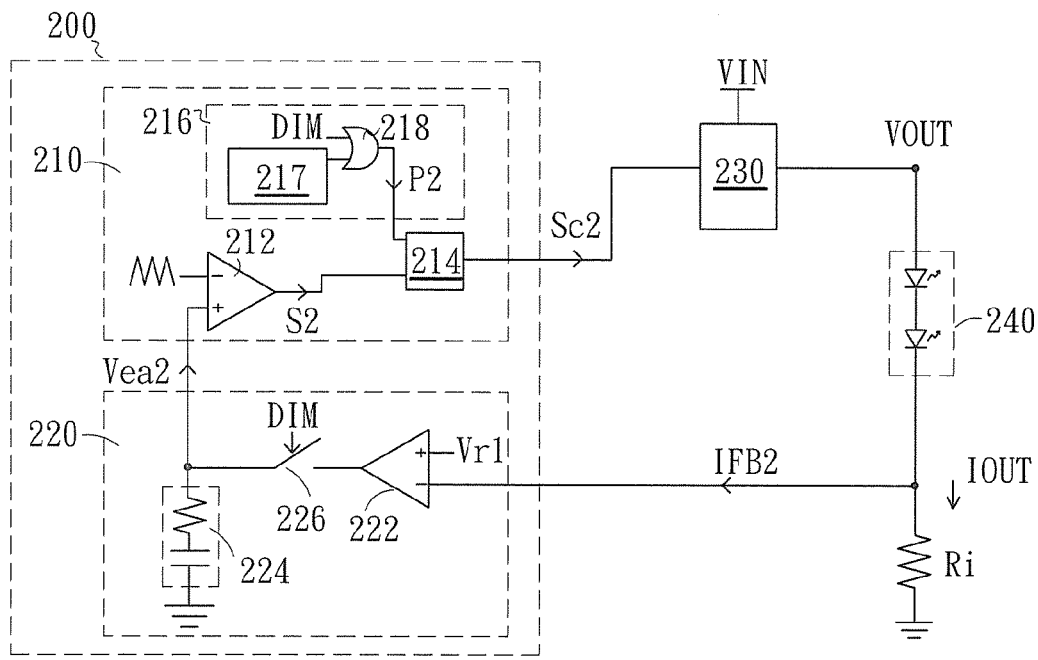
FIG. 3 is a circuit diagram of an LED driving circuit in accordance with a first preferred embodiment of the present invention.

Referring to FIG. 3, which shows a circuit diagram of an LED driving circuit in accordance with a first preferred embodiment of the present invention, the LED driving circuit has a feedback control circuit 200 and a converter circuit 230 for driving an LED module 240. The feedback control circuit 200 receives a current feedback signal IFB2 for feedback control so as to generate a control signal Sc2 to control the converter circuit 230. The input of the converter circuit 230 is coupled to an input voltage source VIN and the output thereof is coupled to the LED module 240. The converter circuit 230 converts the input voltage source VIN according to the control signal Sc2 so as to generate an adequate output voltage VOUT for driving the LED module 240 to have the output current IOUT flowing through the LED module stabilized at a predetermined current value. The output current LOUT also flows through a current detecting resistor Ri for generating the current feedback signal IFB2 representing the output current IOUT.

The feedback control circuit 200 has a feedback unit 220 and a pulse width control unit 210. The feedback unit 220 has an amplify unit 222, a compensation unit 224, and a feedback switch 226. The amplify unit 222 receives a first reference signal Vr1 at a non-inverting input thereof and the current feedback signal IFB2 at an inverting input thereof so as to generate an error signal. The compensation unit 224 generates a pulse width control signal Vea2 according to the error signal. The compensation unit 224 includes a capacitor and a resistor in general. Gain and frequency response of the compensation unit 224 may be adjusted according to the actual condition to improve transient response of feedback control of the feedback control circuit 200. The feedback switch 226 is coupled between the amplify unit 222 and the compensation unit 224 to decide whether the error signal is transmitted to the compensation unit 224 or not according to a dimming signal DIM. When the dimming signal DIM is in a first state indicating ON state, the feedback switch 226 is conducted and the error signal generated by the amplify unit 222 is transmitted through the feedback switch 226 to the compensation unit 224, and when the dimming signal DIM is in a second state indicating OFF state, the feedback switch 226 is cut off to interrupt the transmission of the error signal from the amplify unit 222 to the compensation unit 224.

The pulse width control unit 210 generates the control signal Sc2 according to the pulse width control signal Vea2 for controlling power conversion of the converter circuit 230. The pulse width control unit 210 has a pulse width modulation unit 212, a dimming control unit 216, and a driving unit 214. The pulse width modulation unit 212 may be a comparator, which receives the pulse width control signal Vea2 at a non-inverting input thereof and a triangular signal at an inverting input thereof so as to generate a pulse width modulation signal S2 to the driving unit 214. The dimming control unit 216 has an OR gate 218, which receives a dimming signal DIM and a pulse signal generated by a dimming off control unit 217 so as to generate a dimming control signal P2. The period signal generated by the dimming off control unit 217 may be a period signal with a fixed pulse width. The driving unit 214 receives both the pulse width modulation signal S2 and the dimming control signal P2. When the dimming signal DIM is in the first state, the driving unit 214 generates the control signal Sc2 according to the pulse width modulation signal S2, and when the dimming signal is in the second state, the driving unit 214 generates the control signal Sc2 according to the dimming control signal P2 generated by the dimming control unit 216. That is, the feedback control circuit 200 controls the converter circuit 230 to drive the LED module 240 to generate steady illumination as the dimming signal DIM is in the first state, and the feedback control circuit 200 controls the converter circuit 230 keeps power conversion operation to have the output voltage VOUT sustained at a level close to a lighting threshold voltage of the LED module 240 as the dimming signal DIM is in the second state.

Figure 4:
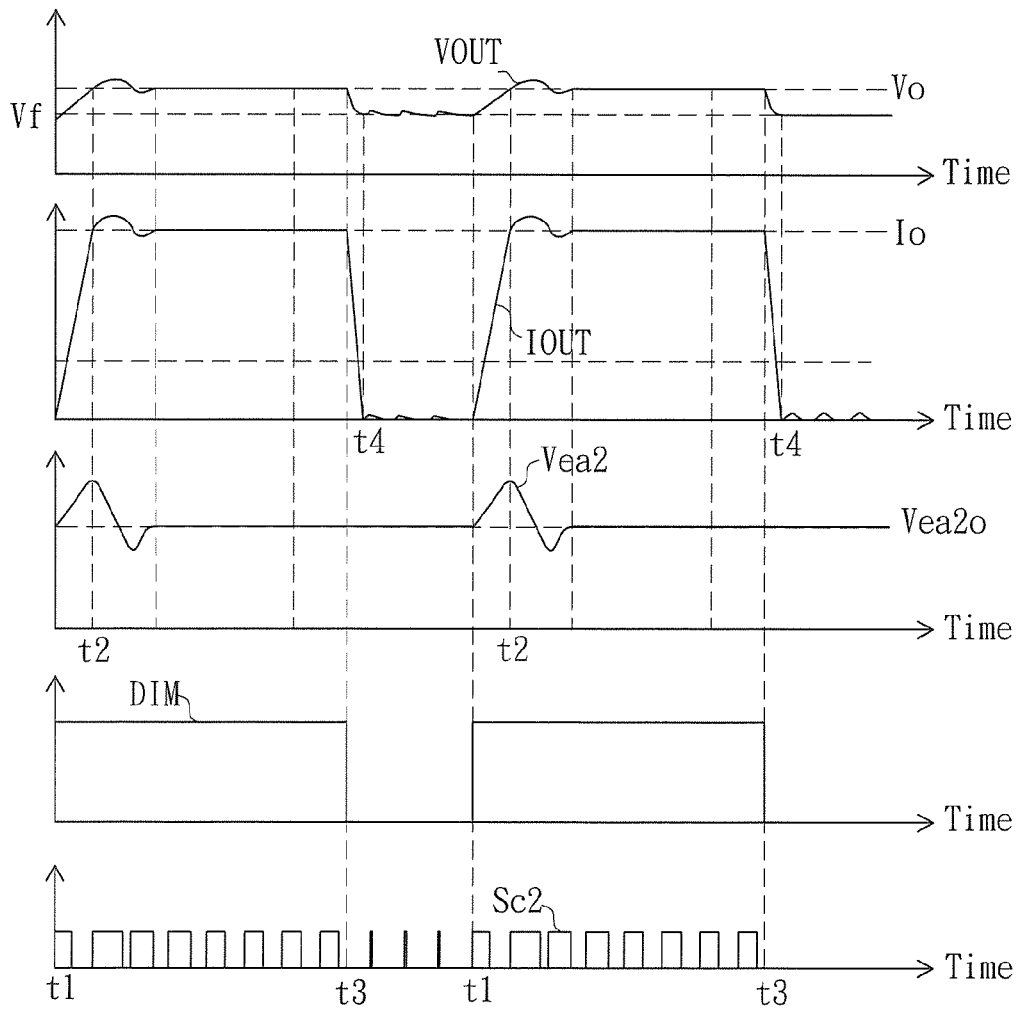
FIG. 4 is a diagram of waveforms showing dimming process of the LED driving circuit in FIG. 3.

FIG. 4 is a diagram of waveforms showing dimming process of the LED driving circuit in FIG. 3. Also referring to FIG. 3, at time point t1, the dimming signal DIM is changed from the low-level second state to the high-level first state, the output voltage VOUT increases from the adjacent of the lighting threshold voltage Vf, and the output current IOUT increases from zero. At this time, the feedback switch 226 is turned on, and the duty cycle of the control signal Sc2 starts at a predetermined duty cycle for feedback control. At time point t2, the output current IOUT reaches the predetermined output current Io and the pulse width control signal Vea2 reaches a peak value. Since the increasing of duty cycle of the pulse width control signal Vea2 begins from a predetermined duty cycle, which is equal to or smaller than a stable level Vea2o corresponded to the predetermined output current Io, rather than the maximum value as described in prior art, the peak value would not reach the maximum value of the pulse width control signal Vea2.

Thus, the output voltage VOUT, the output current IOUT, and the pulse width control signal Vea2 would be stabilized faster than prior art. At time point t3, the dimming signal DIM is changed from the high-level first state to the low-level second state. The output voltage VOUT and the output current IOUT begins to decrease until the output current IOUT declines to zero. At this time, the control signal Sc2 for controlling the converter circuit 230 is a pulse signal so as to have the converter circuit 230 supplies a small amount of power to compensate power loss due to leakage current or etc. Thus, the level of the output voltage VOUT may be sustained at the adjacent of the lighting threshold voltage Vf. That is, the output voltage VOUT would be enhanced attending with the pulses of the pulse signal so as to restrict the output voltage VOUT at the adjacent of the lighting threshold voltage Vf.

The converter circuit with DC output, such as DC-to-DC buck/boost converter circuit, flyback converter circuit, forward converter circuit, and etc., may be applied in the LED driving circuit of the present invention.

Figure 5:
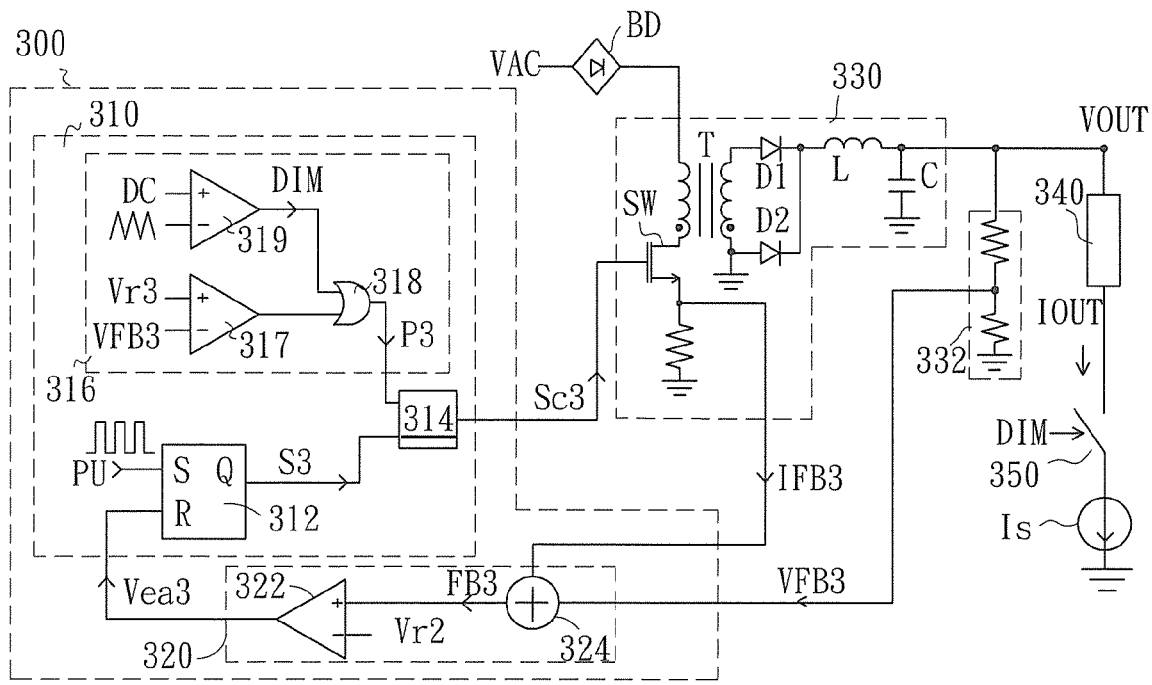
FIG. 5 is a circuit diagram of an LED driving circuit in accordance with a second preferred embodiment of the present invention.

FIG. 5 is a circuit diagram of an LED driving circuit in accordance with a second preferred embodiment of the present invention. In contrast with the first preferred embodiment of FIG. 3, the LED driving circuit of the present embodiment has a driving switch 350 coupled to the LED module 340 to decide whether the power is supplied to the LED module 340 according to the dimming signal DIM. The LED driving circuit has a feedback control circuit 300 and a converter circuit 330 for driving an LED module 340. The converter circuit 330 is coupled to an ac input power source VAC through a bridge rectifier BD and converts the ac input power source VAC to drive the LED module 340 according to a control signal Sc3. In the present embodiment, the converter circuit 330 is a forward converter circuit, which has a transformer T, a transistor SW, rectifier diodes D1, D2, an inductor L, and an output capacitor C. The primary side of the transformer T is coupled to the ac input power source VAC at one end thereof and the transistor SW at the other end. The transistor SW also is grounded through a current detecting resistor, which is utilized for generating a current feedback signal IFB3. The output capacitor C is coupled to the secondary side of the transformer T through the rectifier diodes D1, D2 and the inductor L. In addition, a voltage detecting circuit 332 is coupled to the output capacitor C for generating a voltage feedback signal VFB3 corresponded to the output voltage VOUT. To guarantee steady illumination of the LED module 340, the LED module 340 is coupled to a current source Is to have the output current IOUT stabilized at a predetermined output current.

The feedback control circuit 300 has a feedback unit 320 and a pulse width control unit 310. The feedback unit 320 has a comparator 322 and a signal superposition unit 324. The signal superposition unit 324 receives the current feedback signal IFB3 and the voltage feedback signal VFB3 so as to generate a feedback signal FB3. The comparator 322 receives a second reference signal Vr2 at an inverting input thereof and the feedback signal FB3 at a non-inverting input thereof so as to generate the pulse width control signal Vea3. The pulse width control unit 310 has a SR flip-flop 312, a dimming control unit 316, and a driving unit 314. The SR flip-flop 312 receives a clock signal PU at a set input S and the pulse width control signal Vea3 at a reset input R. When receiving the clock signal PU, the SR flip-flop 312 outputs a pulse width modulation signal S3 at the output Q to the driving circuit 314.

The dimming control unit 316 includes a dimming off control unit 317, an OR gate 318, and a dimmer 319. The dimmer 319 receives a dc dimming signal DC and a triangular signal for generating the dimming signal DIM. The dimming off control unit 317 is a comparator, which receives the voltage feedback signal VFB3 at an inverting input thereof and a third reference signal Vr3 at a non-inverting input thereof. The dimming off control unit 317 generates a signal when the level of the voltage feedback signal VFB3 is lower than the third reference signal Vr3. The OR gate 318 receives the dimming signal DIM and the signal from the dimming off control unit 317 so as to generate a dimming control signal P3. In contrast with the first preferred embodiment, although the period of the signal in accordance with the present embodiment is not fixed, the purpose of the present invention can be also achieved.

The driving unit 314 receives both the pulse width modulation signal S3 and the dimming control signal P3. When the dimming signal DIM is in the first state representing ON state, the driving unit 314 generates the control signal Sc3 according to the pulse width modulation signal S3, and when the dimming signal DIM is in the second state representing OFF state, the driving unit generates the control signal Sc3 according to the dimming control signal P3. When the dimming signal DIM is in the second state, the driving switch 350 would be cut off to sustain the power stored in the output capacitor C and the converter circuit 330 may supply a small amount of power to the output capacitor C to compensate power loss due to leakage current or other causes.

In the present embodiment, a forward converter circuit 330 is used. However, the other converter circuits, such as flyback converter circuit, half-bridge converter circuit, or full-bridge converter circuit, may be adapted in the present embodiment with the feedback control circuit 300 being adequately modified for generating one or more control signals to control the converter circuit 330. Such modification is well known in the field of art and thus is not repeated here.

Figure 7:
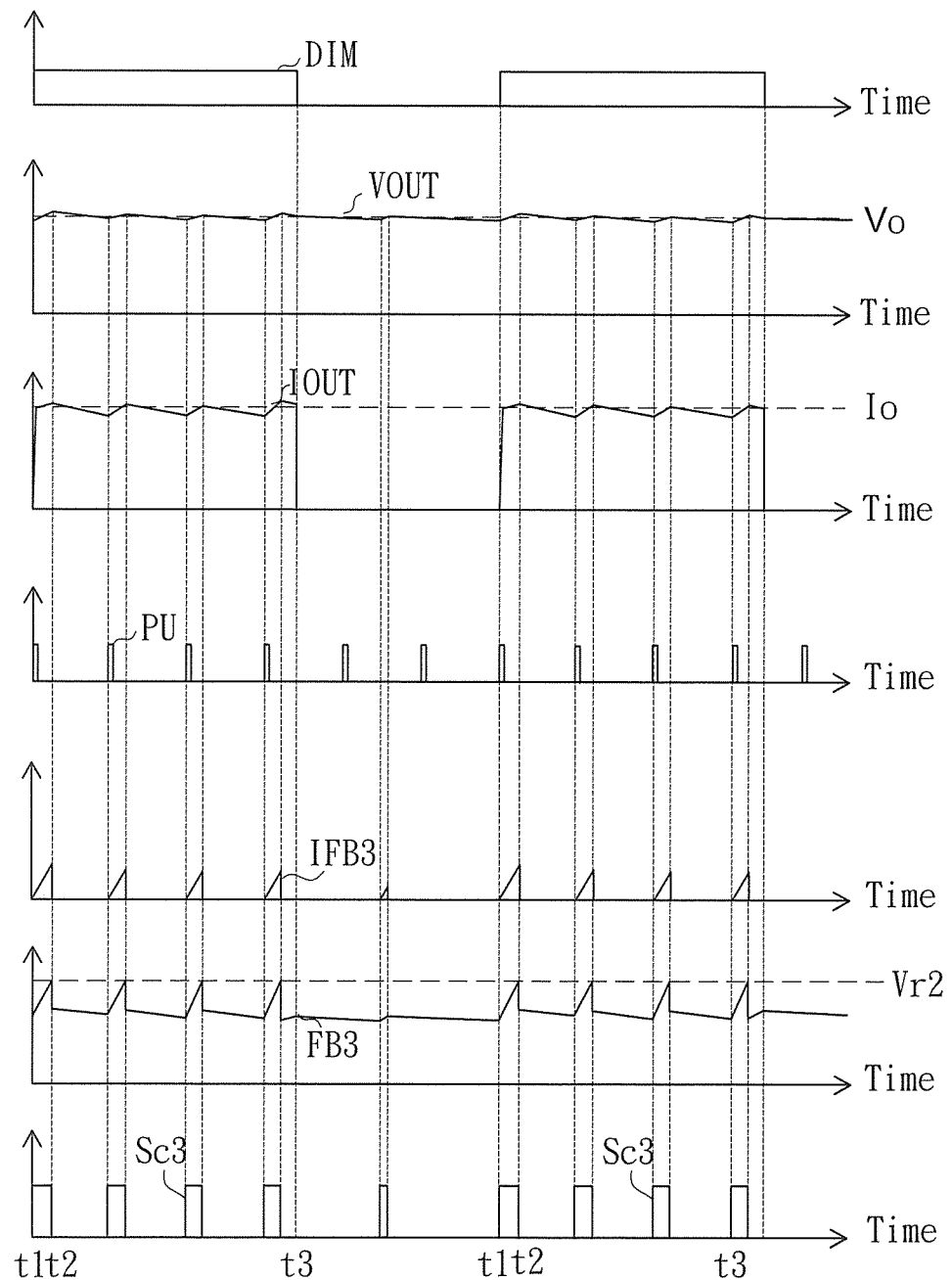
FIG. 7 is a diagram of waveforms showing dimming process of the LED driving circuit in FIG. 5.

FIG. 7 is a diagram of waveforms showing dimming process of the LED driving circuit in FIG. 5. Also referring to FIG. 5, at time point t1, the dimming signal DIM is changed from the low-level second state to the high-level first state and the driving switch 350 is conducted. At this time, the output voltage VOUT increases from a predetermined level, the output current IOUT rapidly increases from zero, the SR flip-flop 312 is triggered by the clock signal PU so as to generate high level output signal to induce high level control signal Sc3, and the level of the current feedback signal IFB3 also increases from zero to enhance the level of the output of the signal superposition unit 324. However, the pulse width control signal Vea3 is still at low. At time point t2, the level of the output of the signal superposition unit 324 reaches the second reference signal Vr2 to have the pulse width control signal Vea3 changed to high. Then, the SR flip-flop 312 is reset to output low level signal so as to have the control signal changed to low. In the next cycle, the clock signal PU triggers the SR flip-flop 312 again to have the SR flip-flop 312 generates high level signal and the operation between time points t1 and t2 is repeated. Thus, the output voltage VOUT and the output current IOUT can be stabilized at a predetermined output voltage Vo and a predetermined output current Io. At time point t3, the dimming signal DIM is changed from the high-level first state to the low-level second state. At this time, the driving switch 350 is cut off, and so the output current IOUT drops to zero quickly but the level of the output voltage VOUT is maintained at the adjacent of the predetermined output voltage Vo. In the time zone from t3 to t1, when the level of the output voltage VOUT declines to a predetermined level to have the voltage feedback signal VFB3 lower than the third reference signal Vr3, the dimming control signal P3 becomes high to induce high level control signal Sc3. Thus, the output voltage VOUT would be enhanced to be above the predetermined level again. Simultaneously, the voltage feedback signal VFB3 is higher than the third reference signal Vr3 again and so the dimming off control unit 317 stops generating signal to induce low level control signal Sc3. That is, the output voltage VOUT would be kept at the neighboring of the predetermined level to get rid of the influence of leakage current. Therefore, as the dimming signal DIM is changed from the low-level second state to the high-level first state again, the output voltage VOUT, which starts at the predetermined level, may reach the stable condition faster to enhance dimming accuracy.

Figure 6:
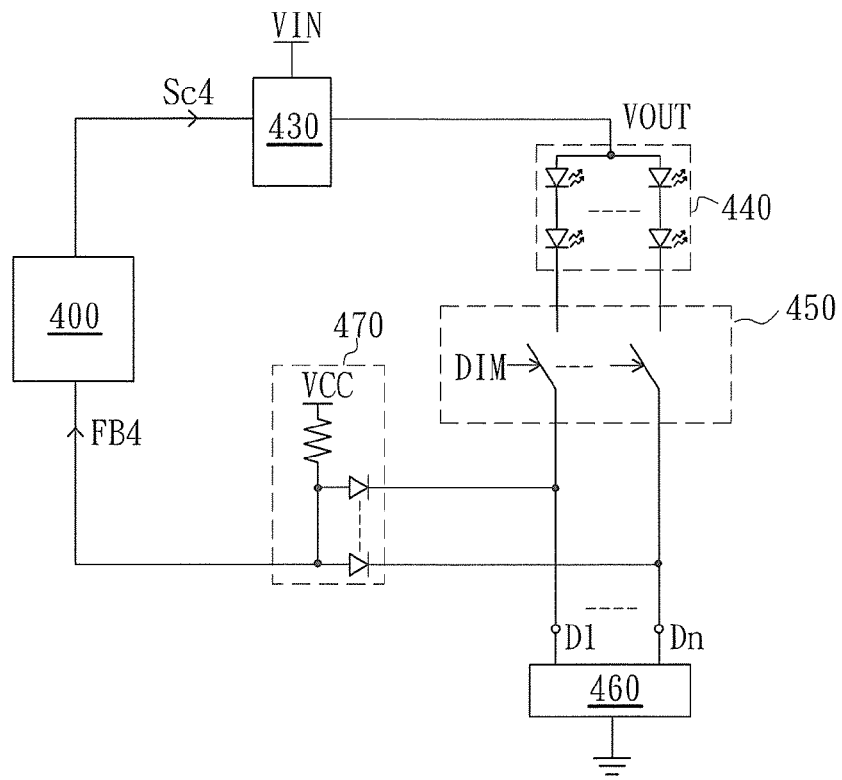
FIG. 6 is a circuit diagram of a LED driving circuit in accordance with a third preferred embodiment of the present invention.

FIG. 6 is a circuit diagram of a LED driving circuit in accordance with a third preferred embodiment of the present invention. As shown, the LED driving circuit includes a feedback control circuit 400 and a converter circuit 430 for driving an LED module 440. The feedback control circuit receives a feedback signal FB4 for feedback control and generates a control signal Sc4 to control the converter circuit 430. The input of the converter circuit 430 is coupled to an input voltage source VIN and the output thereof is coupled to the LED module 440. In contrast with the embodiment of FIG. 3, the LED module 440 in the present embodiment has a plurality of LED strings connected in parallel. To make sure the currents flowing through each of the LED units in the LED module 440 are substantially identical, a current balancing unit 460 with a plurality of current balancing nodes D1~Dn corresponding to the LED strings in the LED module 440 is used for balancing LED currents of the LED strings so as to have the LED current stabilized at a predetermined output current. In addition, a plurality of driving switches 450 are coupled between the corresponded LED string of the LED module 450 and the corresponded current balancing node D1~Dn of the current balancing unit 460. Because the levels of the driving voltage for generating an LED current with the predetermined output current value on the LED strings are usually different, the voltage levels of the current balancing nodes D1~Dn may be different. In order to make sure the current balancing unit 460 is normally operated to have the LED current stabilized at the predetermined output current, the voltage levels of the current balancing nodes D1~Dn must be maintained above a lowest operable voltage level. For the purpose, an extreme voltage detecting circuit 470 coupled to the plurality of current balancing nodes D1~Dn is provided for generating a feedback signal FB4 according to a level of a lowest one among all the current balancing nodes D1~Dn. The extreme voltage detecting circuit 470 has a plurality of diodes with negative ends thereof coupled to the corresponded current balancing nodes D1~Dn and positive ends thereof coupled to a driving power source VCC through a resistor. Only the diode corresponding to the current balancing node with the lowest level would be forward biased. The other diodes remain off because of the insufficient voltage drop. Thus, the level of the feedback signal FB4 equals to the level of the current balancing node with the lowest level plus forward bias voltage of the diode. The operation of the feedback control circuit 400 is substantially identical to that in FIG. 3 and thus is not repeated here.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. A feedback control circuit, utilized for controlling a converter circuit to convert a power for driving an LED module, comprising:
    a feedback unit, receiving a feedback signal responding to a state of the LED module and generating a pulse width control signal accordingly; and
    a pulse width control unit, generating at least one control signal for controlling the converter circuit according to the pulse width control signal, and the pulse width control unit having:
        a dimming control unit, generating a dimming control signal according to a dimming signal and a pulse signal generated by a diming off control unit; and
        a driving unit, generating the least one control signal according to the pulse width control signal and the dimming control signal;
    wherein the dimming signal is changed between a first state and a second state, the feedback control circuit controls the converter circuit to drive the LED module to generate steady illumination as the dimming signal is in the first state, and the feedback control circuit controls the converter circuit keeps operating to have an output voltage thereof sustained at a level close to a lighting threshold voltage of the LED module as the dimming signal is in the second state.

2. The feedback control circuit of claim 1, wherein the feedback unit includes an amplifier and a compensation unit, the amplifier receives a first reference signal at a non-inverting input thereof and the feedback signal at an inverting input thereof, and is coupled to the compensation unit through an output thereof to have the compensation unit generating the pulse width control signal.

3. The feedback control circuit of claim 2, wherein the feedback unit includes a switch coupled between the amplifier and the compensation unit, for coupling or decoupling the amplifier and the compensation unit according to the dimming signal.

4. The feedback control circuit of claim 2, wherein the dimming off control unit includes a pulse generator, for generating the pulse signal with a fixed frequency and a fixed pulse width.

5. The feedback control circuit of claim 2, wherein the dimming off control unit is a comparator, which receives the feedback signal at an inverting input thereof and a third reference signal at a non-inverting input thereof and generates the pulse signal as a level of the feedback signal is lower than that of the third reference signal.

6. The feedback control circuit of claim 3, wherein the feedback signal is a current feedback signal corresponding to a current flowing through the LED module or a voltage feedback signal corresponding to the output voltage applied to the LED module.

7. The feedback control circuit of claim 1, wherein the feedback unit includes a comparator, the pulse width control unit includes a flip-flop, the comparator receives a second reference signal at an inverting input thereof and the feedback signal at a non-inverting input thereof for generating the pulse width control signal to the flip-flop.

8. The feedback control circuit of claim 7, wherein the dimming off control unit includes a pulse generator, for generating the pulse signal with a fixed frequency and a fixed pulse width.

9. The feedback control circuit of claim 7, wherein the dimming off control unit is a comparator, which receives the feedback signal at an inverting input thereof and a third reference signal at a non-inverting input thereof and generates the pulse signal as a level of the feedback signal is lower than that of the third reference signal.

10. The feedback control circuit of claim 1, wherein the dimming off control unit includes a pulse generator, for generating the pulse signal with a fixed frequency and a fixed pulse width.

11. The feedback control circuit of claim 1, wherein the dimming off control unit is a comparator, which receives the feedback signal at an inverting input thereof and a third reference signal at a non-inverting input thereof and generates the pulse signal as a level of the feedback signal is lower than that of the third reference signal.

12. An LED driving circuit, for driving an LED module having a plurality of LED strings connected in parallel, and the LED driving circuit comprising:
a current balancing module, having a plurality of current balance nodes corresponding to the plurality of LED strings for balancing currents on the plurality of LED strings;
an extreme voltage detecting circuit, coupled to the plurality of current balancing nodes and generating a feedback signal according to levels of the plurality of current balancing nodes;
a converter circuit, coupled to the LED module, for converting an input voltage into an output voltage to drive the LED module; and
a feedback control circuit, receiving a dimming signal and being changed to a first state or a second state according to the dimming signal for controlling power conversion of the converter circuit;
wherein an average amount of power converted by the converter circuit when the feedback control circuit is in the first state is greater than that when the feedback control circuit is in the second state, and the average amount of power in the second state is greater than zero.

13. The LED driving circuit of claim 12, further comprising a plurality of driving switches coupled to the corresponded LED strings for interrupting power transmission from the converter circuit to the corresponded LED string when the feedback control circuit is in the second state.

14. The LED driving circuit of claim 12, wherein the feedback control circuit includes a pulse generator, for generating a pulse signal with a fixed frequency and a fixed pulse width.

15. The LED driving circuit of claim 12, wherein the feedback control circuit includes a comparator, which receives the feedback signal at an inverting input thereof and a third reference signal at a non-inverting input thereof and generates a pulse single when a level of the feedback signal is lower than that of the third reference signal.

* * * * *